United States Patent [19]

Fey et al.

[11] 4,139,438
[45] Feb. 13, 1979

[54] ARC HEATER PRODUCTION OF SILICON INVOLVING ALKALI OR ALKALINE-EARTH METALS

[75] Inventors: Maurice G. Fey, Plum Borough; Francis J. Harvey, II, Murrysville; Jack McDonald, Penn Hills, all of Pa.

[73] Assignee: Westinghouse Electric Corp., Pittsburgh, Pa.

[21] Appl. No.: 891,992

[22] Filed: Mar. 31, 1978

Related U.S. Application Data

[62] Division of Ser. No. 757,546, Jan. 6, 1977, Pat. No. 4,102,765.

[51] Int. Cl.² .................. B01K 1/00; C01B 33/02
[52] U.S. Cl. .................................. 204/164; 423/350
[58] Field of Search ............... 204/164; 423/348, 349, 423/350

[56] References Cited

U.S. PATENT DOCUMENTS

| | | | |
|---|---|---|---|
| 3,325,314 | 6/1967 | Allegretti | 148/175 |
| 3,649,497 | 3/1972 | Kugler et al. | 204/164 |
| 4,080,194 | 3/1978 | Fey | 75/10 R |

FOREIGN PATENT DOCUMENTS

| | | | |
|---|---|---|---|
| 651374 | 10/1962 | Canada | 423/350 |
| 1041483 | 10/1958 | Fed. Rep. of Germany | 423/350 |
| 1129145 | 5/1962 | Fed. Rep. of Germany | 423/350 |
| 855913 | 12/1960 | United Kingdom | 423/350 |

*Primary Examiner*—F. Edmundson
*Attorney, Agent, or Firm*—L. P. Johns

[57] ABSTRACT

A process for producing high purity silicon characterized by the employment of an electric arc heater into which a silicon halide is injected together with a metal reductant such as an alkali metal or an alkaline-earth metal which are reacted together by projecting them tangentially into a reaction chamber to cause the formation of liquid silicon and a gaseous metal halide salt which are separated in a suitable manner such as centrifugally or by condensation.

4 Claims, 5 Drawing Figures

ARC HEATER PRODUCTION OF SILICON INVOLVING ALKALI OR ALKALINE-EARTH METALS

CROSS-REFERENCE TO RELATED APPLICATIONS

This is a division, of application Ser. No. 757,546 filed Jan. 6, 1977 now U.S. Pat. No. 4,102,765.

The parent application is related to Ser. No. 745,728, now U.S. Pat. No. 4,080,194; Ser. No. 745,726, now U.S. Pat. No. 4,107,445; and Ser. No. 757,545, now U.S. Pat. No. 4,102,985.

BACKGROUND OF THE INVENTION

Field of the Invention

This invention relates to a process for the production of high purity silicon by the use of an electric arc heater and, more particularly, it pertains to a reaction chamber in which a silicon halide is reacted with an alkali or alkaline-earth metal, the products of which are phase separated.

Description of the Prior Art

Prior processes for the production of high purity silicon are generally characterized by high costs and low capacity. One method for producing high purity silicon involves the following steps: (1) carbothermically reducing silica to metallurgical silicon, (2) converting the metallurgical silicon to an intermediate compound such as $SiHCl_3$, (3) purifying the intermediate compound, and (4) decomposing the intermediate compound to silicon.

Silicon produced by this process is very costly and, thus, economically unsuitable for use in many applications and, in particular, in solar electric power generation devices.

SUMMARY OF THE INVENTION

It has been found in accordance with this invention that the foregoing processes may be substituted for by the process of this invention which is characterized by the steps of halogenating a silicon-bearing raw material to produce a halide of silicon, providing an arc heater having spaced electrodes and forming an arc chamber communicating with a reaction chamber, striking an electric arc in an axial gap between the electrodes, introducing an arc gas selected from the group consisting of an inert gas, hydrogen, carbon monoxide and a mixture thereof through the gap to provide an elongated arc stream extending into the reaction chamber, feeding into the arc stream a quantity of a metal reductant selected from the group consisting of an alkali metal and an alkaline-earth metal, feeding into the arc stream a quantity of silicon halide to react with the metal reductant to produce reaction products including liquid silicon and a gaseous salt of the metal reductant, projecting the reaction products into the reaction chamber tangentially to cause the liquid silicon to separate from the vapor phase salt, and depositing the liquid silicon on a downwardly extending surface to permit the liquid silicon to flow into an associated receptacle.

The advantage of the process of this invention is that it employs an electric arc heater to provide the ultra-high temperatures needed to reduce a silicon halide to pure liquid elemental silicon and a vapor phase co-product salt for the so-called "solar-grade silicon" needed for the manufacture of large-area photovoltaic arrays. Thus, elemental silicon is produced in the molten state which is suitable for subsequent processing to large-area sheets or solar arrays. This process is dependent upon the use of electric arc heaters which provide the required process energy without contaminating the molten silicon product.

DESCRIPTION OF THE PREFERRED EMBODIMENTS

In accordance with this invention the process is carried out as follows:

(a) providing an arc heater having spaced generally hollow, cylindrical electrodes forming an arc chamber communicating with a reaction chamber;

(b) striking an electric arc in an axial gap between the electrodes;

(c) introducing a gas selected from the group consisting of hydrogen, carbon monoxide an inert gas, and a mixture thereof through the gap to provide an elongated arc stream extending into the reaction chamber;

(d) feeding into the arc stream a quantity of one metal selected from the group consisting of an alkali metal and an alkaline-earth metal;

(e) feeding into the arc stream a quantity of a halide, such as a tetrachloride or tetrabromide, of silicon, the co-products being a liquid elemental silicon and a gaseous metal salt;

(f) projecting the reaction products into the reaction chamber tangentially to cause the liquid silicon to separate centrifugally or by condensation from the lighter gaseous alkali metal salt; and (g) depositing the liquid silicon on the downwardly extending surface to permit the silicon to flow into an associated receptacle.

Figure 1:
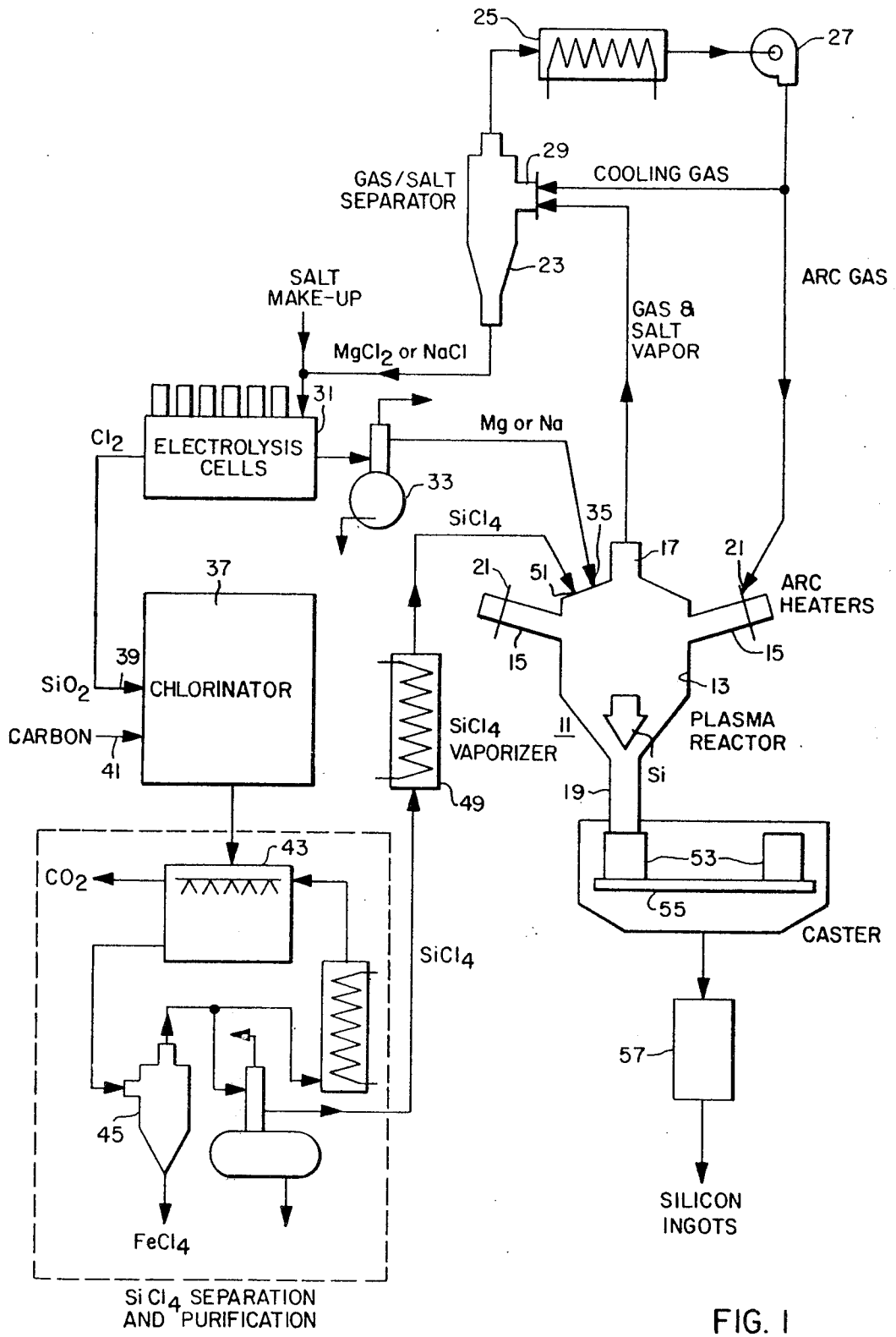
FIG. 1 is a flow diagram.

The process may be carried out in a reactor generally indicated at 11 in the drawings. The reactor 11 is supported by associated structures as shown in FIG. 1. The reactor 11 comprises a centrifugal or plasma chamber 13, at least one and preferably a plurality of arc heaters 15, a first vent or outlet means 17 for co-product gases, and second vent or outlet means 19 for elemental silicon.

The arc gas is introduced into the system at 21 through the arc heaters 15, as will be set forth more particularly below. The gas together with the lighter co-products including salt vapor leave the reactor through the outlet means 17 and are connected to a cyclone type separator 23 for separating the gas and salt, the former of which is transmitted to a heat exchanger 25 for cooling and redirected by a pump 27 into the arc heaters at inlet 21. Cooling gas may be introduced at inlet 29 of the separator to remove the heat of vaporization of the salt liquid. The salt leaves the lower end of the separator 23 from where it is conducted to at electrolysis cell 31 for disassociating the salts into their primary elements, such as sodium or magnesium and chlorine or bromine. The metal sodium or magnesium flows through a purifier 33 to an inlet 35 where it is introduced into the reactor.

The resulting chlorine from the cell 31 is conducted to a chlorinator 37 where, together with silicon dioxide, introduced at inlet 39 and a carbonaceous material such as coke, introduced at inlet 41, reacts with the chlorine to produce a silicon tetrachloride ($SiCl_4$), other halides and carbon dioxide which are directed to a washer 43 for separation. The silicon tetrachloride proceeds through a cyclone separator 45 for removal of any foreign materials such as $FeCl_3$, from where the tetrachloride is moved to a vaporizer 49 and then to the reactor 11 at an inlet 51.

The end product is elemental silicon which drops through the outlet means 19 into a mold 53 (FIG. 1) which is one of a plurality of similar molds placed upon a rotatable platform 55 by which a plurality of similar molds 53 may be filled. Thereafter, optionally ingots may be removed from the mold 53 and subjected to a remelting stage 57 to further refine the silicon such as by degassing. It is understood, however, that the molten silicon can alternatively be removed for direct processing to single crystals or large area sheets.

Figure 2:
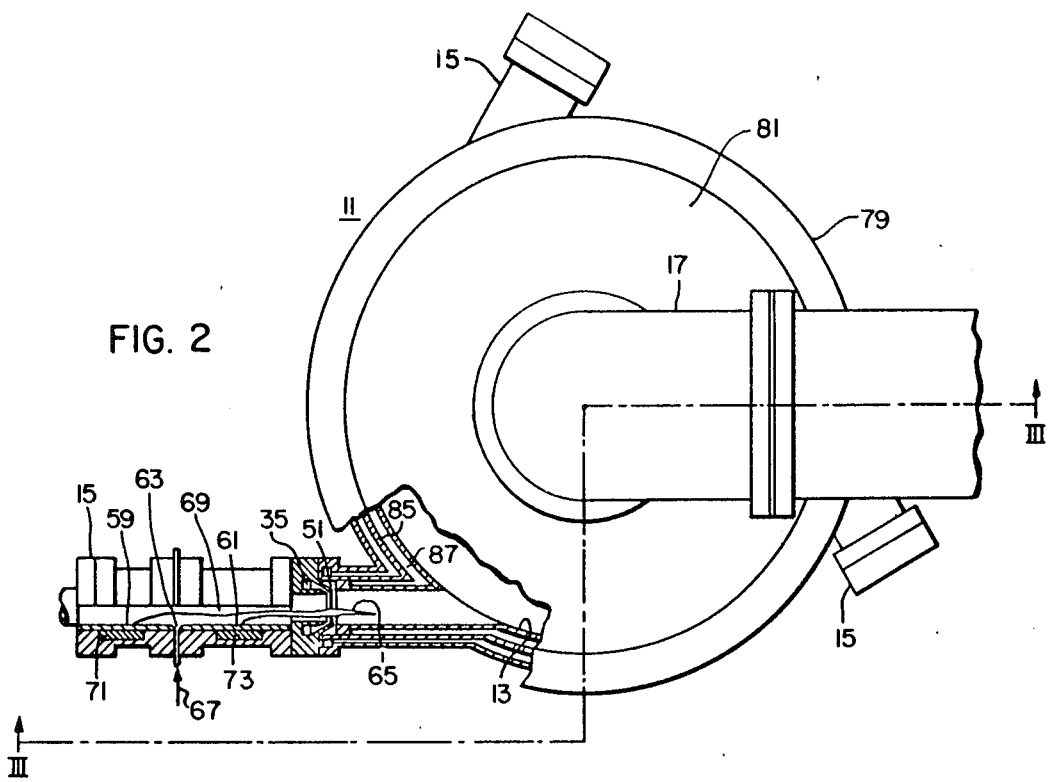
FIG. 2 is a plan view partly in section of the reactor having three arc heaters.

As shown in FIG. 2, one or more and preferably three arc heaters 15 are similar in construction and operation to that disclosed in U.S. Pat. No. 3,765,870, entitled "Method Of Direct Or Reduction Using A Short Gap Arc Heater" of which the inventors are M. G. Fey and George A. Kemeny, and incorporated by reference as part hereof. Because of the full disclosure in that patent, the description of the arc heaters 15 is limited herein to the basic structure and operation. The arc heaters 15 (FIG. 2) are each a single phase, self-stabilizing AC device capable of power levels up to about 35 kilowatts, or up to about 10,000 kilowatts for a three phase plant insulation. In the practice of this invention, it is preferred that three arc heaters be provided, one for each of the three phases of the AC power supply. As shown in FIG. 2, the arc heater 15 has two annular copper electrodes 59, 61 which are spaced at 63 about one millimeter apart to accommodate a line frequency power source of about 4 kV. An arc 65 occurs in the space or gap 63 and incoming feed stock gas immediately blows the arc 65 from the space into the interior of the arc chamber 69. The feed stock gas 67 must be compatible with silicon and may be one of the gases selected from the group consisting of inert gas, hydrogen, carbon monoxide, or a mixture thereof. The arc 65 rotates at a speed of about 1000 revolutions per second by interaction of the arc current (several thousands amps AC) with a DC magnetic field set up by internally mounted field coils 71, 73. The velocities yield a very high operating efficiency for equipment of this type and the elongated arc 65 is ultimately projected by the gas downstream toward and possibly into the reaction chamber 13. Feed stock material is introduced through inlet ports 75, 77, and is heated to reaction conditions by the arc heated gas.

The reacting materials are halides of silicon, and a metal of the alkali or alkaline-earth metals, such as sodium and magnesium, the latter of which is preferred for economic reasons. The silicon halide, however, is not limited to tetrachloride, and may include any halide, such as tetrabromides. When introduced into the downstream arc zone the materials introduced through the inlet ports 75, 77 react substantially as shown in the following formulas:

$$SiCl_4 + 4Na \rightarrow Si + 4NaCl \uparrow \quad (1)$$

$$SiCl_4 + 2Mg \rightarrow Si + 2MgCl_2 \uparrow \quad (2)$$

$$SiBr_4 + 2Mg \rightarrow Si + 2MgBr_2 \uparrow \quad (3)$$

The foregoing formulas are exemplary of the number of possibilities available for producing the respective metals, it being understood that silicon is introduced as either a chloride or bromide which in turn is reacted with either sodium or magnesium to produce the products indicated in the formulas (1), (2), (3). For the foregoing reactions to successfully produce silicon, it must be produced in the molten state at a temperature greater than the boiling point of the co-product salt, whereby they are subsequently separated with the silicon in the liquid state and the salt in the gaseous state. The minimum reaction temperature for the foregoing formulas must be above the boiling point of either of the salts, that is, the chloride or bromide of sodium or magnesium. The maximum temperature being about 3000° K. (2727° C.). In the following Table, a list of the melting points of silicon and the boiling points for the several compounds or salts are listed.

TABLE

| Element | Melting Point | Compound | Boiling Point |
|---|---|---|---|
| Silicon | 1410° C | $MgCl_2$ | 1412° C |
| | | NaCl | 1413° C |
| | | $MgBr_2$ | 1284° C |

Figure 3:
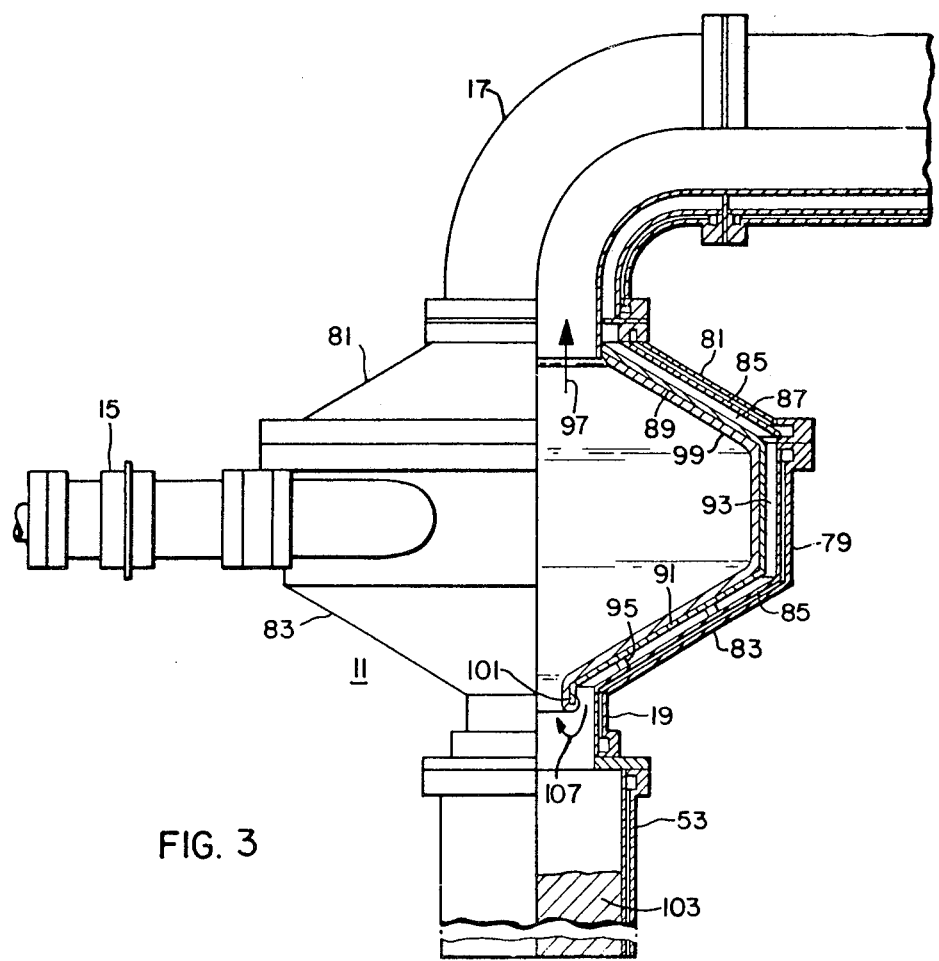
FIG. 3 is a vertical view taken on the line III—III of FIG. 2.

As shown in FIGS. 2 and 3, the arc heaters 15 are connected to the centrifugal or plasma chamber 13 tangentially. The chamber 13 is preferably cylindrical (FIG. 3) to enhance centrifugal separation of the light and heavy co-products of the foregoing reactions, whereby the lighter, gaseous products such as the salts, leave the reactor 11 via the outlet means 17 and the heavier element exits through the outlet means 19.

The chamber 13 is contained between a peripheral wall 79 and opposite end walls 81, 83. The upper end wall 81 is preferably tapered upwardly from the peripheral wall 79 and joins the lower end of the outlet means 17 so that the co-product gases are more readily directed from the centrifugal zone within the chamber 13 towards the outlet means 17. Similarly, the lower end wall 83 is inclined downwardly, and as shown in the embodiment of FIG. 3, joins the outlet means 19 which communicates with the ingot mold or collection chamber 53 for the silicon formed during the reaction. More particularly, the peripheral wall 79 and end walls 81, 83 are preferably cooled by water jacket means 85 of a conventional nature.

Moreover, in accordance with this invention, the chamber 13 comprises an inner wall or liner 87 which is substantially concentrically disposed and spaced from the peripheral wall 79 and the end walls 81, 83. The inner wall 87 preferably comprises upwardly and inwardly inclined upper wall portion 89 and a lower wall portion 91. the spacing 93 between the peripheral and end walls 79, 81, 83 and the inner walls 87, 89, 91 is maintained in a suitable manner such as by spaced support rings 95 (FIG. 3).

The inner wall means including the walls 87, 89, 91 are provided to operate at high wall temperatures. As the liquid silicon separates centrifugally from the cool product gas which leaves the reaction chamber 13 through the outlet as indicated by the arrow 97, the liquid silicon deposits on the inner walls 87, 89, 91 to form a solidified silicon layer 97 having a thickness which is established by heat transfer equilibrium which thickness is limited to several inches. The inner walls 87, 89, 91 are cooled by radiation to the water cooled outer walls 79, 81, 83. The thickness of the solidified silicon layer 97 is dependent upon a temperature gradient through the layer as well as the thermal equilibrium status within the chamber including the zone between inner wall 87 and the peripheral wall 79. Accordingly, the surface of the silicon layer 97 farthest from the inner wall 87 remains liquid and runs down the layer surface and exits at the lower end thereof into the ingot mold 53. For that purpose, the lower end of the inner wall 91 is preferably provided with a flange or drip flange 101 extending into the outlet means 19, thereby preventing the molten silicon from depositing on or contacting the walls forming the outlet means 19. Thus, a silicon ingot 103 forms in the ingot mold 53.

Figure 5:
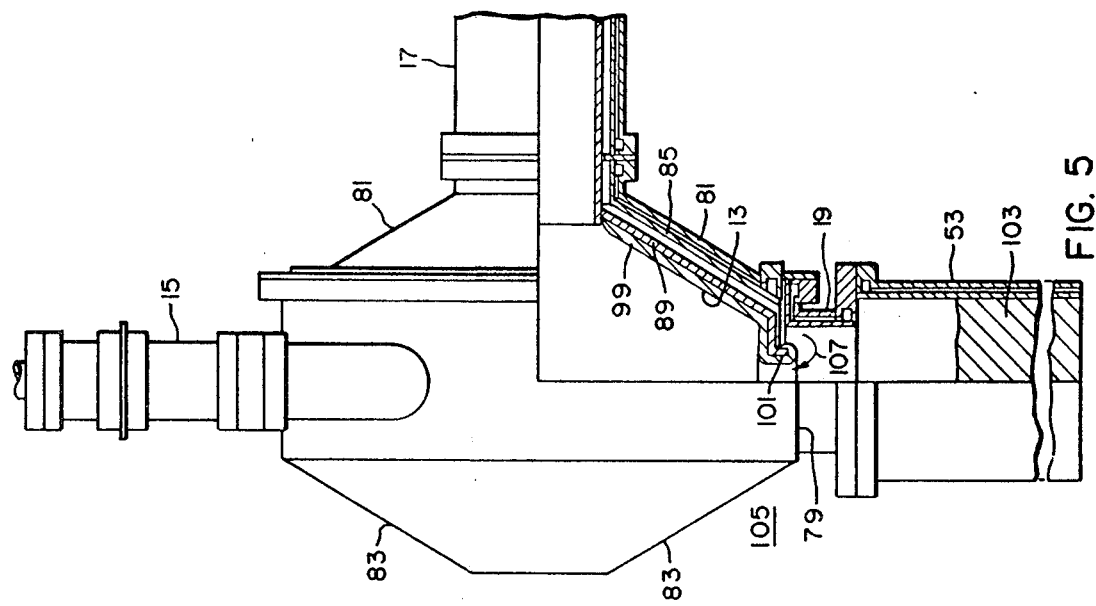
FIG. 5 is an elevational view, partly in section, taken on the line V—V of FIG. 4.
Figure 4:
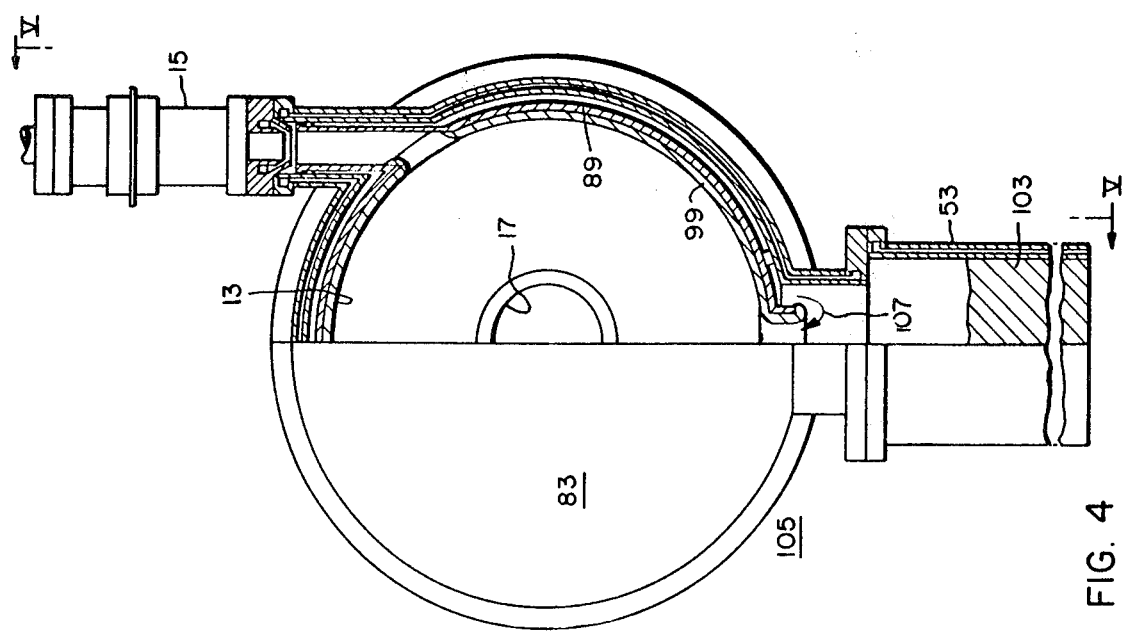
FIG. 4 is an elevational view, partly in section, of another embodiment of the invention.

Another embodiment of the invention is shown in FIGS. 4 and 5 in which a reactor generally indicated at 105 comprises parts with reference numbers similar to those of the reactor 11 (FIGS. 2 and 3). More particularly, the reactor 105 (FIGS. 4 and 5) is disposed on a different axis so that the lowermost part of the reactor 105 is a portion of the peripheral wall 79 where the outlet means 19 is disposed for accumulating the downwardly flowing liquid silicon as it accumulates at the metal layer 99. The gas outlet means 17 is disposed in the end wall 81 similar to that of the reactor 11. In all other respects the reactor 105 has similar structural and operational features as those of the reactor 11.

In addition, the exterior of the liner 89 should be blanketed by an inert gas to prevent oxidation. Furthermore, the inert gas should be circulated as shown by the arrow 107 to prevent the entrance of any undesirable materials such as magnesium chloride into the casting chamber of the mold 53.

An example of the process for sodium reduction from silicon tetrachloride is as follows.

EXAMPLE

The overall reaction in the arc heater reduction of SiCl$_4$ using sodium as a reductant is

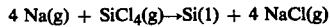

$$4\,Na(g) + SiCl_4(g) \rightarrow Si(l) + 4\,NaCl(g)$$

The standard free energy charge for this reaction at temperatures above 1700° K., i.e., above the melting point of silicon and the boiling point of sodium chloride, is very negative and, therefore, the reaction should go to completion. For example, at 2200° K. the standard free energy change is −112.3 Kcal/mole Si. Similarly, the standard free energy change for the magnesium reduction is 2200° K. is −76.9 Kcal/mole. The theoretical energy requirement for the sodium reduction carried out at this temperature is 2.10 hw-hr/lb of Si for an arc heater operating at 75% efficiency and an initial reactant temperature of 25° C. This requirement refers to the process configuration in which the arc heater is operating directly on silicon tetrachloride. For the case in which a 66% H$_2$, 33% argon gas mixture is used as the heat transfer medium at an enthalpy level of 12,000 BTU's/lb, then 0.515 lbs. of the hydrogen-argon mixture is required per pound of silicon. If the hydrogen-argon mixture exits, the reduction reactor at 2200° K. and all sensible heat in the gas is lost, then the overall energy requirement is 2.41 kw-hr/lb of Si at 75% arc heater efficiency. Similar calculations show that the theoretical energy requirement for magnesium reduction is 1.42 kw-hr/lb of Si at 75% arc heater efficiency for direct feed of SiCl$_4$ into the arc heater while the use of a 66% H$_2$, 33% Ar arc heater gas requires 1.63 kw-hr/lb of Si at 75% efficiency.

The chlorination and electrolysis steps of the proposed process will also require energy input. For example, the sodium regeneration step requires 7.5 kw-hr/lb of sodium (24.6 kw-hr/lb of Si), while magnesium requires 9 kw-hr/lb of magnesium (15.6 kw-hr/lb of Si). The energy requirement for the chlorination step will depend on the composition of the silica-bearing starting material, the carbon source and the chlorination temperature.

The raw materials requirements are 2.14 lbs silica per pound of silicon, a minimum of 0.86 lbs. of carbon, and make-up sodium or magnesium chloride and arc heater heat transfer gas as appropriate.

Finally, though the silicon is preferably separated centrifugally, other means such as by condensation in a condensation chamber may be also used.

Accordingly, the reactor of the present invention provides for a unique assembly of an arc heater and reaction chamber which is suitable for either single phase or three phase operation, i.e. for three or six arc heaters the latter of which has two phases. Such an assembly is also suitable for high power and high production rates in continuous operation. Finally, an arc heater and reaction chamber design which in the case of exothermic reaction, provides the utilization of at least part of heat reaction in promoting reaction.

What is claimed is:

1. A process for producing the high purity silicon comprising the steps of:
    (a) halogenating a silica-bearing material to produce a halide of silicon,
    (b) providing an arc heater having spaced generally hollow, cylindrical electrodes forming an arc chamber communicating with a reaction chamber,
    (c) striking an electric arc in an axial gap between the electrodes,
    (d) introducing an arc gas selected from the group consisting of an inert gas, hydrogen, carbon monoxide or a mixture thereof through the gap to provide an elongated arc stream extending into the reaction chamber,
    (e) feeding into the arc stream a quantity of a metal reductant selected from the group consisting of an alkali metal and an alkaline-earth metal,
    (f) feeding into the arc stream a quantity of silicon halide to react with the metal reductant to produce reaction products including liquid silicon and a salt of the metal reductant,
    (g) projecting the reaction products into the reaction chamber tangentially to cause the liquid silicon to separate centrifugally from the salt, and
    (h) depositing the liquid silicon on a downwardly extending surface to permit the liquid silicon to flow into an associated receptacle.

2. The process of claim 1 wherein the halogen is chlorine.

3. The process of claim 1 wherein the halogen is bromine.

4. The process of claim 1 wherein the halogen is fluorine.

* * * * *